United States Patent
Lin

(10) Patent No.: US 10,679,665 B1
(45) Date of Patent: Jun. 9, 2020

(54) CONTROL METHOD OF OPTICAL DISC DRIVE SYSTEM WHEN OPTICAL DISC WRITE FAILURE OCCURS

(71) Applicants: Lite-On Electronics (Guangzhou) Limited, Guangzhou (CN); LITE-ON TECHNOLOGY CORPORATION, Taipei (TW)

(72) Inventor: Che-Ching Lin, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 16/426,045

(22) Filed: May 30, 2019

(30) Foreign Application Priority Data

Apr. 3, 2019 (CN) .......................... 2019 1 0267535

(51) Int. Cl.
*G11B 7/00* (2006.01)
*G11B 20/10* (2006.01)
*G11B 7/0045* (2006.01)

(52) U.S. Cl.
CPC ............ *G11B 20/10* (2013.01); *G11B 7/0045* (2013.01)

(58) Field of Classification Search
None
See application file for complete search history.

(56) References Cited

U.S. PATENT DOCUMENTS

| | | | | |
|---|---|---|---|---|
| 5,796,690 A | * | 8/1998 | Kanno ................... | G06F 3/0601 369/47.18 |
| 6,308,296 B1 | * | 10/2001 | Sasaki ................ | H04N 1/00326 386/E5.061 |
| 2001/0026679 A1 | * | 10/2001 | Koshino ............ | G11B 20/1251 386/231 |
| 2006/0023586 A1 | * | 2/2006 | Ogawa ............... | G11B 7/00736 369/47.1 |
| 2008/0019247 A1 | * | 1/2008 | Nakamura ......... | G11B 20/1217 369/53.31 |
| 2013/0091237 A1 | * | 4/2013 | Arulambalam ......... | H04L 65/60 709/213 |
| 2013/0194904 A1 | * | 8/2013 | Ochi ..................... | G11B 20/18 369/53.42 |
| 2013/0246721 A1 | * | 9/2013 | Fukutomi ............. | G06F 3/0604 711/155 |

* cited by examiner

*Primary Examiner* — Peter Vincent Agustin
(74) *Attorney, Agent, or Firm* — WPAT, PC

(57) ABSTRACT

A control method of an optical disc drive system is provided. Firstly, a first write command is issued to burn a first write data including plural data files to an optical disc in an optical disc drive. If a write fail message from the optical disc drive is received after a specified data block of a specified data file is transmitted to the optical disc drive, the transmission of the first write data is stopped. Then, a data amount of the specified data file that has not been transmitted to the optical disc drive is calculated, and a dummy data with the data amount is generated. Then, the dummy data and the other data files that have not been transmitted are burnt to the optical disc.

4 Claims, 9 Drawing Sheets

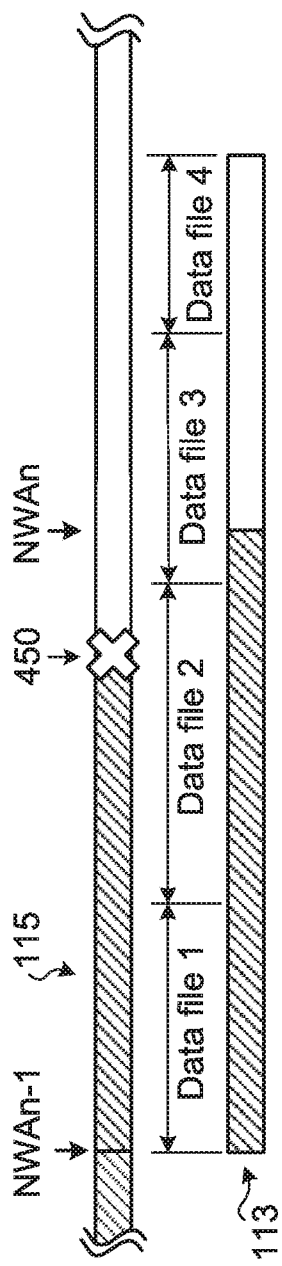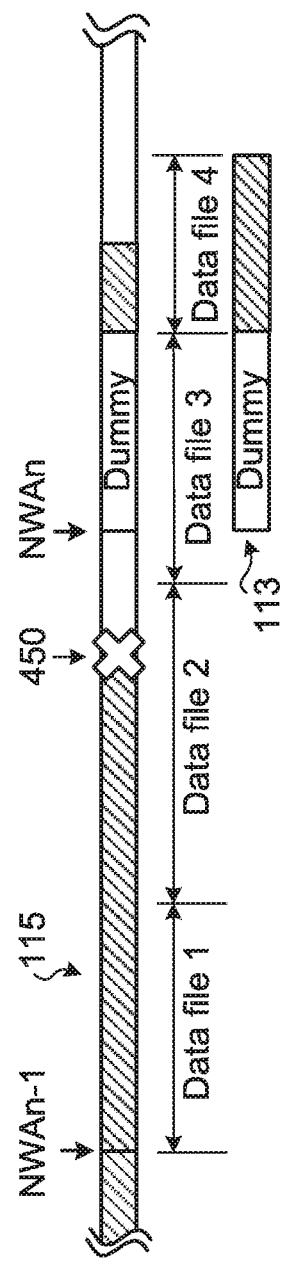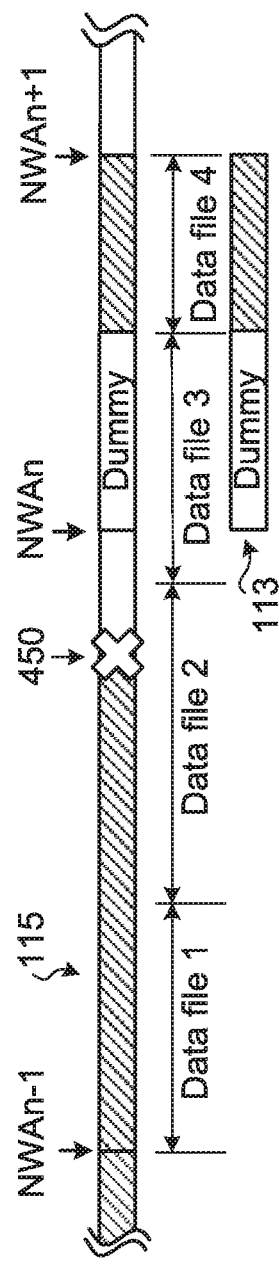

CONTROL METHOD OF OPTICAL DISC DRIVE SYSTEM WHEN OPTICAL DISC WRITE FAILURE OCCURS

This application claims the benefit of People's Republic of China Patent Application No. 201910267535.8, filed Apr. 3, 2019, the subject matter of which is incorporated herein by reference.

FIELD OF THE INVENTION

The present invention relates to a control method of an optical disc drive system, and more particularly to a control method of an optical disc drive system when an optical disc write failure occurs.

BACKGROUND OF THE INVENTION

As is well known, optical discs can retain data for a very long time when compared with the hard disc drive and the solid state drive (SSD). Consequently, the seldom-read cold data are usually stored in the optical discs.

FIG. 1 is a schematic functional block diagram illustrating the architecture of an optical disc drive system. As shown in FIG. 1, the optical disc drive system comprises an optical disc drive 10 and a host 12. The optical disc drive 10 is connected with the host 12 through an external bus 20. The optical disc drive 10 comprises a control circuit 101 and a buffer 113. For example, the external bus 20 is a SATA bus, and the buffer 113 is a dynamic random access memory (DRAM).

When the host 12 intends to store a write data into an optical disc 115, the host 12 issues a write command and a write data to the optical disc drive 10. The write data is temporarily stored in the buffer 113 by the control circuit 101. Then, the control circuit 101 controls an optical pickup head to emit a laser beam to burn the write data to the corresponding track of the optical disc 115.

FIGS. 2A-2D schematically illustrate a writing process for the optical disc drive system. For example, the writing process is a sequential writing process.

After the previous writing operation of the optical disc 115 is completed, a next write address (NWA) is recorded in a lead-in area of the optical disc 115. When the optical disc drive 10 receives the write data and the write command from the host 12 again, the optical disc drive 10 reads the previously-recorded next write address (NWA) from the lead-in area of the optical disc 115. In addition, the optical disc drive 10 burns the write data to the tracks of the optical disc 115 from the next write address (NWA).

As shown in FIG. 2A, the next write address NWAn−1 has been recorded in the optical disc 115. For example, the host 12 intends to burn the write data to the optical disc 115. The write data contains a first data file (Data file 1) and a second data file (Data file 2).

Firstly, the host 12 issues the write command and starts to transmit the write data to the buffer 113. During the process of transmitting the write data, the write data is divided into plural data blocks by the host 12. The data blocks are sequentially transmitted to the optical disc drive 10 and temporarily stored in the buffer 113. For example, the data amount of each data block is 64K bytes.

As shown in FIGS. 2A, 2B, 2C and 2D, the received data is temporarily stored in the buffer 113.

Please refer to FIG. 2A. After a sufficient amount of write data has been accumulated in the buffer 113, the control circuit 101 starts the writing operation. In addition, the control circuit 101 controls the optical pickup head to burn the write data to the corresponding track of the optical disc 115 from the next write address NWAn−1.

Please refer to FIG. 2B. While the optical pickup head burns the write data to the corresponding track of the optical disc 115, the write data is continued to transmit from the host 12 to the buffer 113.

Please refer to FIG. 2C. The entire of the write data has been transmitted from the host 12 to the buffer 113. Meanwhile, the optical pickup head still burns the write data to the corresponding track of the optical disc 115. That is, the entire of the write data has not been completely burnt to the corresponding track of the optical disc 115.

Please refer to FIG. 2D. After the first data file (Data file 1) and the second data file (Data file 2) of the write data are burnt to the corresponding track of the optical disc 115, the writing operation is completed. That is, the entire of the write data has been completely burnt to the optical disc 115. Meanwhile, the next address of the final burning address of the track of the optical disc 115 is the new next write address NWAn. In addition, the new next write address NWAn is recorded in the lead-in area of the optical disc 115.

FIG. 3 schematically illustrates the relationship between the optical disc and the buffer when an optical disc write failure occurs. While the control circuit 101 starts to perform the writing operation and control the optical pickup head to burn the write data to the corresponding track of the optical disc 115 from the next write address NWAn−1, the write data is continued to transmit from the host 12 to the buffer 113.

While the optical pickup head burns the write data to the position 300 of the track of the optical disc 115 and the optical disc write failure occurs, the optical disc drive 10 stops burning the write data and also stops operation. Meanwhile, the optical disc drive 10 responds a write fail message to the host 12.

Since the optical disc drive 10 is not successfully burn the entire of the write data to the optical disc 115 and the optical disc drive 10 stops operation, the control circuit 101 cannot update the new next write address NWAn in the lead-in area of the optical disc 115. Without the new next write address NWAn, the optical disc drive 10 cannot continue to perform any writing operation on that optical disc 115.

Nowadays, the storage capacity of the optical disc is gradually increased. The storage capacity of the single-layer Blu-ray disc reaches 25 G bytes. The storage capacity of the dual-layer Blu-ray disc reaches 50 G bytes. The storage capacity of the triple-layer Blu-ray disc exceeds 100 G bytes.

As mentioned above, if the optical disc write failure occurs while the optical disc drive performs the writing operation on an optical disc, the optical disc drive cannot continue to perform any writing operation on that optical disc. Since the storage capacity of the Blu-ray disc is very huge, once the optical disc write failure occurs and the residual storage space on that Blu-ray disc is no longer available, a lot of storage space is wasted.

SUMMARY OF THE INVENTION

An embodiment of the present invention provides a control method of an optical disc drive system when an optical disc write failure occurs. Firstly, a first write command is issued to burn a first write data to an optical disc in an optical disc drive, wherein the first write data contains plural data files. If a write fail message from the optical disc drive is received after a specified data block of a specified data file of the plural data files is transmitted to the optical disc drive, the transmission of the first write data is stopped. Then, a data amount of the specified data file that has not been transmitted to the optical disc drive is calculated, and a dummy data with the data amount is generated. Then, a second write command is issued to burn a second write data to the optical disc in the optical disc drive, wherein the dummy data and the other data files that have not been transmitted are served as the second write data.

Another embodiment of the present invention provides a control method of an optical disc drive system when an optical disc write failure occurs. Firstly, a first write command is issued to burn a first write data to an optical disc in an optical disc drive, wherein the first write data contains plural data files. If a write fail message from the optical disc drive is received after a specified data block of a specified data file of the plural data files is transmitted to the optical disc drive, the transmission of the first write data is stopped. Then, a blank track search command is issued to confirm an affected data file of the plural data files. Then, a first data amount of the specified data file that has not been transmitted to the optical disc drive is calculated. Then, a second data amount of the affected data file is calculated. Then, a dummy data with a total data amount of the first data amount and the second data amount is generated. Then, a second write command is issued to burn a second write data to the optical disc in the optical disc drive, wherein the dummy data and the other unaffected data files that have not been transmitted are served as the second write data.

A further embodiment of the present invention provides a control method of an optical disc drive system when an optical disc write failure occurs. Firstly, a first write command and a first write data are received from a host, wherein the first write data contains plural data blocks. When a writing operation is performed according to the first write command, an optical pickup head is controlled to burn the first write data to a track of an optical disc from a next write address of the optical disc. If the optical disc write failure occurs after a specified data block of the plural data blocks is received, the writing operation is stopped, an updated next write address is set according to a burning end address of the specified data block, the updated next write address is recorded into the optical disc, and a write fail message is generated to the host.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIGS. 6A-6C schematically illustrate a variant example of the control method of the optical disc drive system according to the first embodiment of the present invention when an optical disc write failure occurs;

DETAILED DESCRIPTION OF PREFERRED EMBODIMENTS

The present invention provides an optical disc drive system. If the optical disc write failure occurs while the optical disc drive performs the writing operation, it is necessary to take a proper measure to allow the write data continues to be burnt to the optical disc 115 in order to efficiently use the storage space of the optical disc 115. For achieving the above purpose, the present invention provides a control method of the optical disc drive system. Hereinafter, some examples of the control method will be described.

Figure 1:
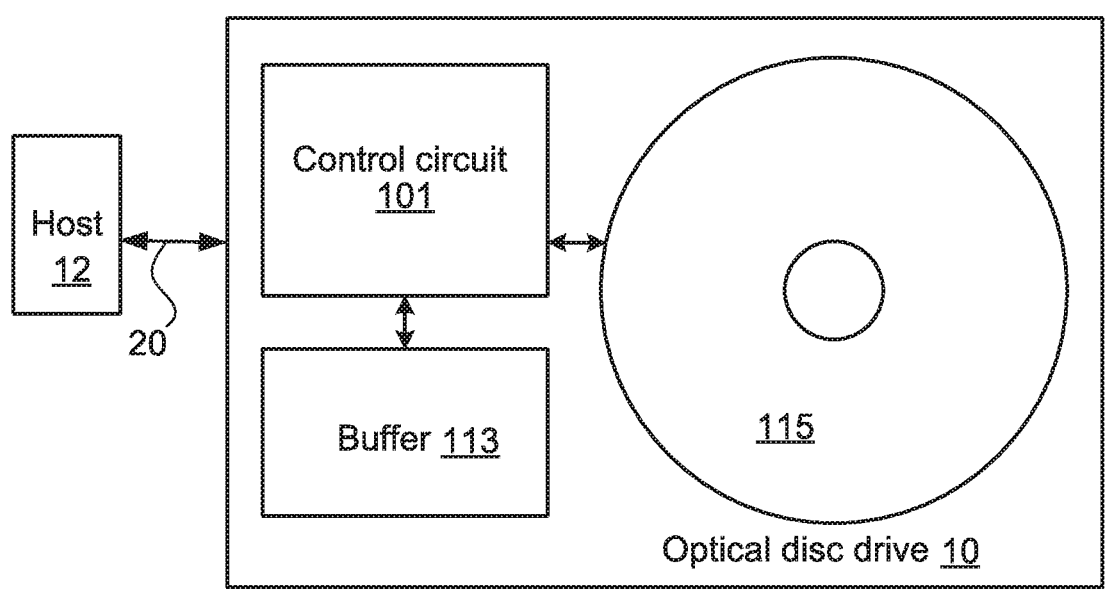
FIG. 1 (prior art) is a schematic functional block diagram illustrating the architecture of an optical disc drive system.
Figure 2A:
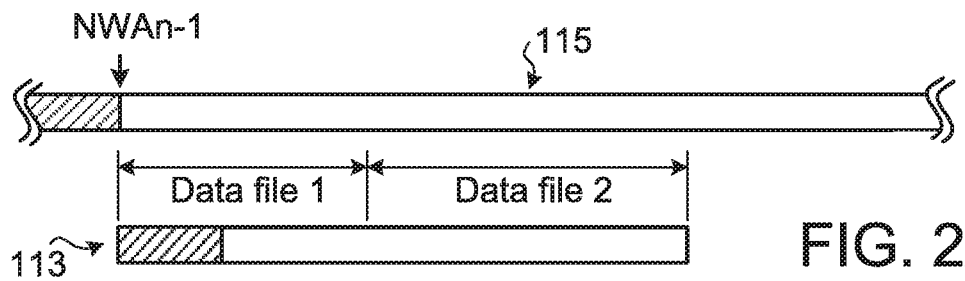
FIGS. 2A-2D (prior art) schematically illustrate a writing process for the optical disc drive system.
Figure 2B:
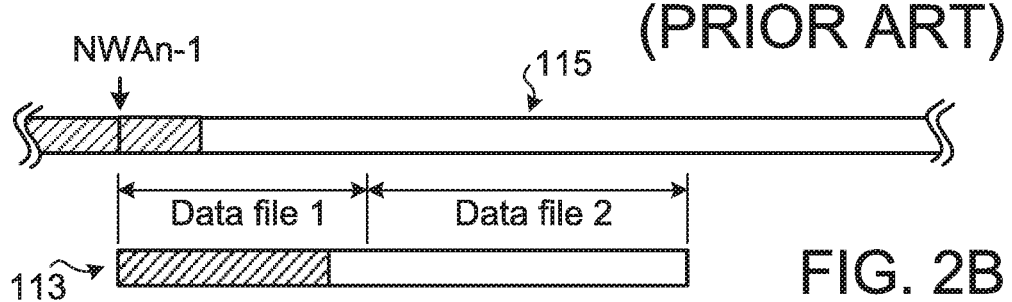
Figure 2C:
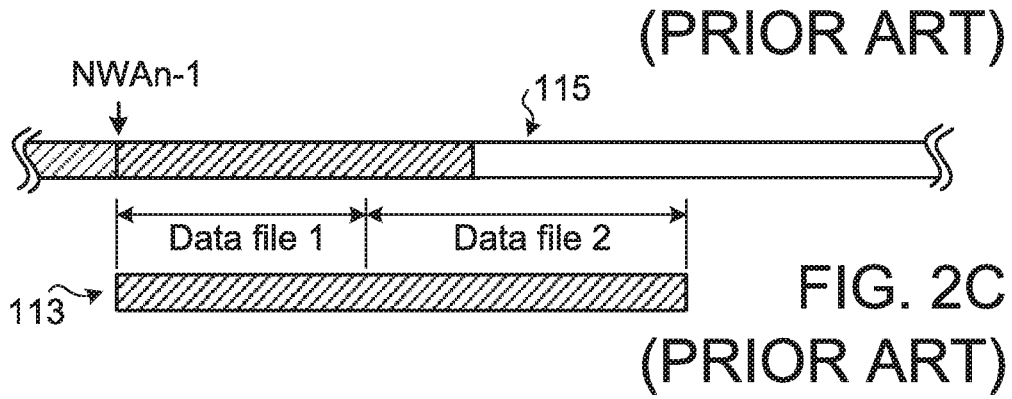
Figure 2D:
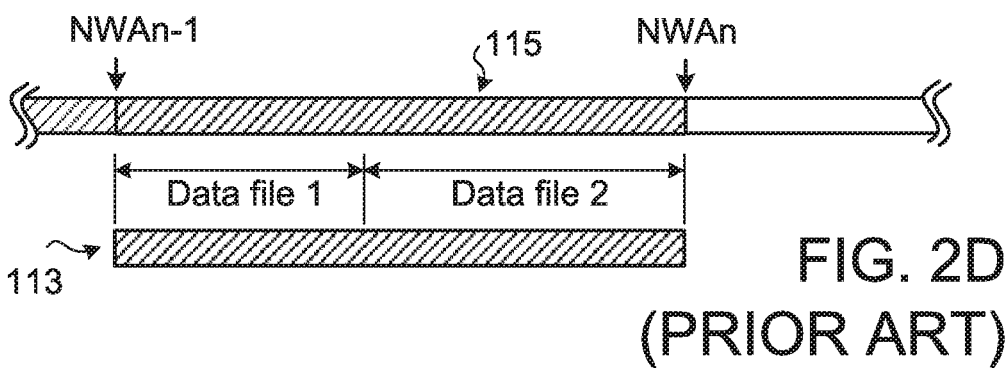
Figure 3:
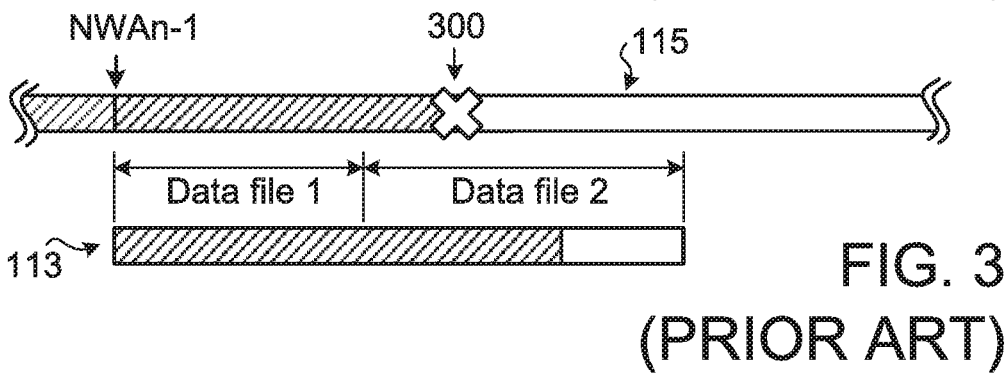
FIG. 3 (prior art) schematically illustrates the relationship between the optical disc and the buffer when an optical disc write failure occurs.
Figure 4A:
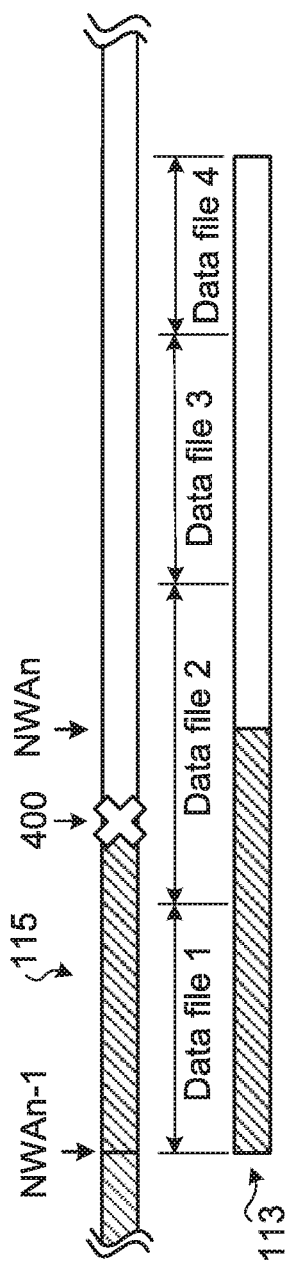
FIGS. 4A-4C schematically illustrate a control method of an optical disc drive system according to a first embodiment of the present invention when an optical disc write failure occurs.
Figure 4B:
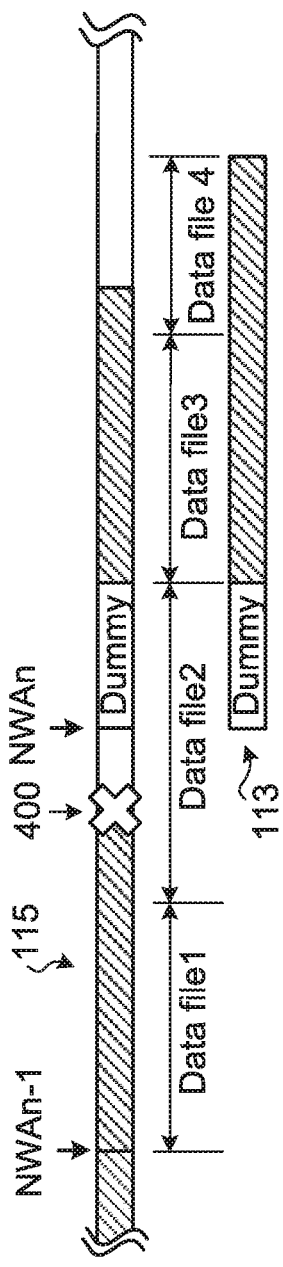
Figure 4C:
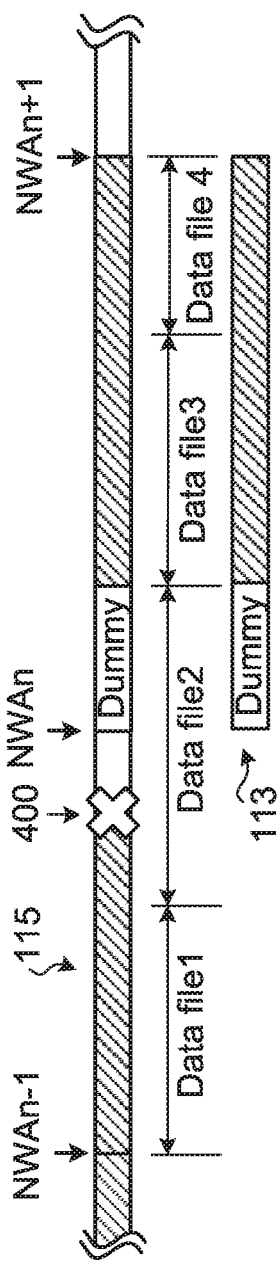

FIGS. 4A-4C schematically illustrate a control method of an optical disc drive system according to a first embodiment of the present invention when an optical disc write failure occurs. For example, the host 12 intends to burn a write data including a first data file (Data file 1), a second data file (Data file 2), a third data file (Data file 3) and a fourth data file (Data file 4) to the optical disc 115. The host 12 issues the write command and the write data to the optical disc drive 10. In addition, the write data is temporarily stored in the buffer 113 by the control circuit 101.

During the process of transmitting the write data, the write data is divided into plural data blocks by the host 12. The data blocks are sequentially transmitted to the optical disc drive 10 and temporarily stored in the buffer 113. For example, the data amount of each data block is 64K bytes.

When the control circuit 101 intends to perform the writing operation, the optical disc drive 10 reads the previously-recorded next write address (NWA) from the lead-in area of the optical disc 115.

When the writing operation is started, the control circuit 101 controls the optical pickup head to burn the write data to the corresponding track of the optical disc 115 from the next write address NWAn−1. In addition, the write data is continued to transmit from the host 12 to the buffer 113.

Please refer to FIG. 4A. The optical pickup head burns the data block of the second data file (Data file 2) to the optical disc 115, and the optical disc write failure occurs while the optical pickup head burns the data block to the position 400 of the track of the optical disc 115. Meanwhile, the optical disc drive 10 stops burning the write data. Moreover, the control circuit 101 responds a write fail message to the host 12.

When the host 12 receives the write fail message from the optical disc drive 10, the host 12 stops transmitting the write data to the optical disc drive 10. Moreover, according to the last data block that the host 12 transmits to the optical disc drive 10, the host 12 can confirm the damaged data file. As shown in FIG. 4A, the last data block belongs to the second data file (Data file 2). Consequently, the host 12 confirms that the second data file (Data file 2) is damaged.

In this embodiment, the control circuit 101 sets the next write address (NWA) according to the information of the last data block. Please refer to FIG. 4A. The control circuit 101 sets the next address of the burning end address of the last data block on the track of the optical disc 115 as the next write address NWAn. Moreover, the next write address NWAn is recorded in the lead-in area of the optical disc 115. The last data block received by the control circuit 101 is the last data block that is sent from the host 12 to the optical disc drive 10. In this embodiment, the last data block is temporarily stored in the buffer 113 but is not completely burnt to the track of the optical disc 115.

The write command from the host 12 contains the start address of burning the corresponding data block on the track of the optical disc 115 and the burning length. According to the write command, the control circuit 101 can obtain the burning end address of the last data block on the track of the optical disc 115, and there is no need to actually burn the last data block to the optical disc 15.

After the next write address NWAn is recorded in the optical disc 115 and the host 12 confirms that the second data file (Data file 2) is damaged, the data amount of the second data file (Data file 2) that has not been transmitted to the optical disc drive 10 is calculated by the host 12. Moreover, the second data file (Data file 2) that has not been transmitted to the optical disc drive 10 is replaced by a dummy data. For example, if the data amount of the second data file (Data file 2) that has not been transmitted to the optical disc drive 10 is 500 Mbytes, the host 12 generates a dummy data with the data amount of 500 Mbytes.

That is, in the second data file (Data file 2), the data amount of which the burning address is posterior to the next write address NWAn is calculated by the host 12 and is replaced by the dummy data.

Then, please refer to FIG. 4B. The host 12 issues the write command again. In the write command, the dummy data, the third data file (Data file 3) and the fourth data file (Data file 4) are served as the write data. The write data is transmitted to the buffer 113. Accordingly, the control circuit 101 starts the writing operation again, and controls the optical pickup head to burn the write data to the corresponding track of the optical disc 115 from the next write address NWAn. Similarly, the control circuit 101 can read the previously-recorded next write address NWAn from the lead-in area of the optical disc 115.

Please refer to FIG. 4C. After the write data including the dummy data, the third data file (Data file 3) and the fourth data file (Data file 4) is burnt to the corresponding track of the optical disc 115, the writing operation is completed. The next address of the final burning address of the track of the optical disc 115 is the new next write address NWAn+1. And, the new next write address NWAn+1 is recorded in the lead-in area of the optical disc 115.

Figure 5A:
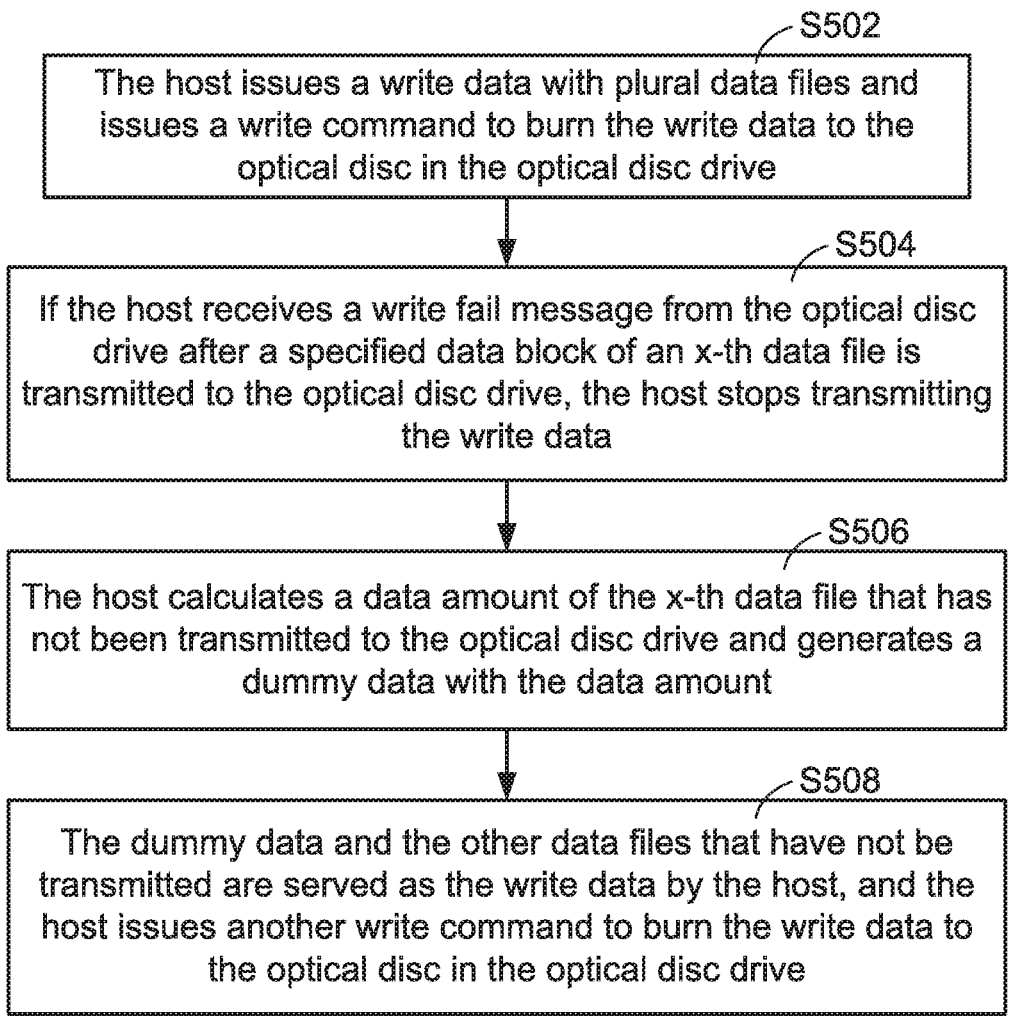
FIG. 5A is a flowchart illustrating the operations of the host according to the first embodiment of the present invention when the optical disc write failure occurs.
Figure 5B:
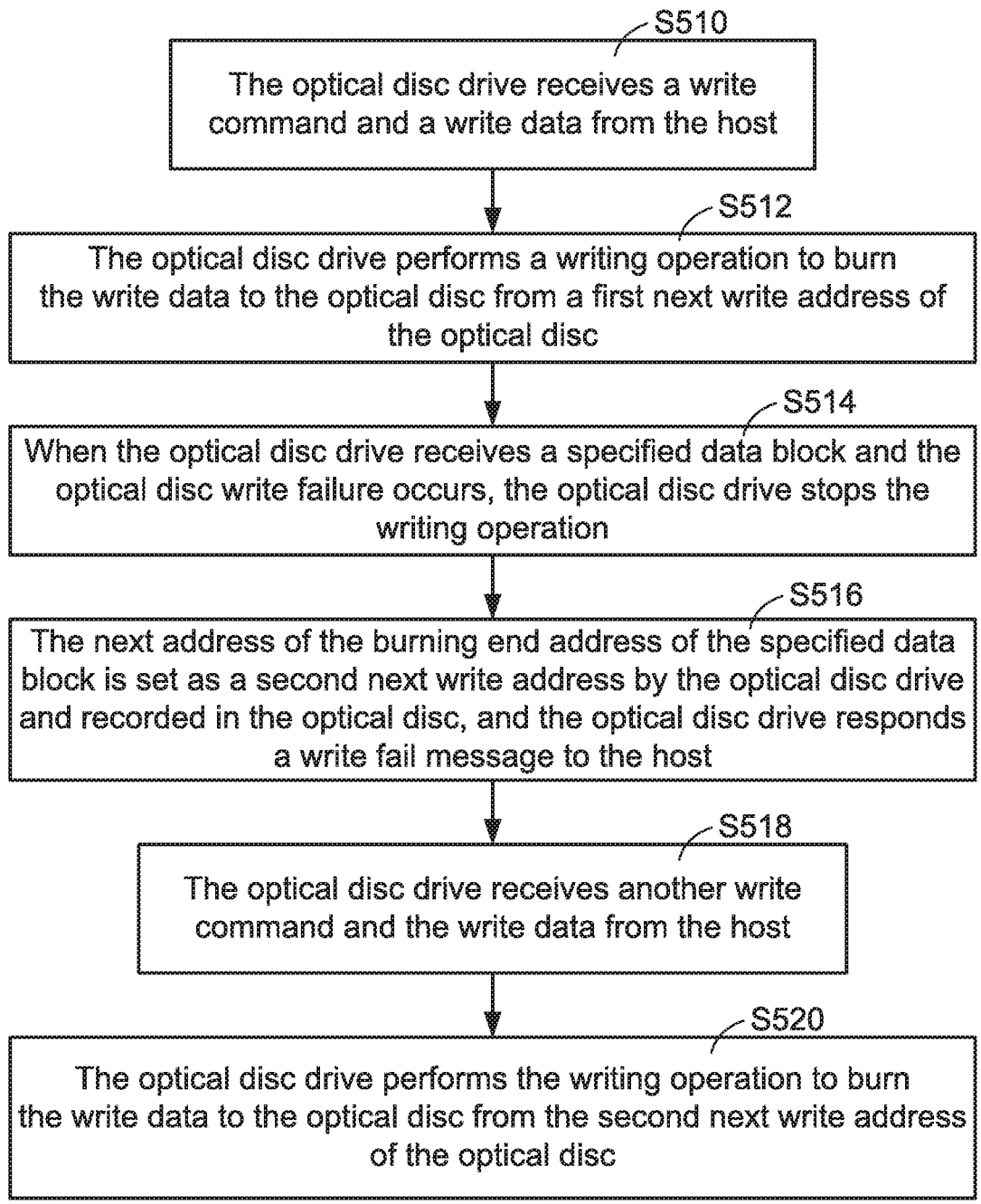
FIG. 5B is a flowchart illustrating the operations of the optical disc drive according to the first embodiment of the present invention when the optical disc write failure occurs.

FIG. 5A is a flowchart illustrating the operations of the host according to the first embodiment of the present invention when the optical disc write failure occurs. FIG. 5B is a flowchart illustrating the operations of the optical disc drive according to the first embodiment of the present invention when the optical disc write failure occurs.

Please refer to FIG. 5A. Firstly, in a step S502, the host 12 issues a write data with plural data files and issues a write command to burn the write data to the optical disc 115 in the optical disc drive 10.

If the host 12 receives a write fail message from the optical disc drive 10 after a specified data block of an x-th data file is transmitted to the optical disc drive 10, the host 12 stops transmitting the write data (Step S504).

In a step S506, the host 12 calculates a data amount of the x-th data file that has not been transmitted to the optical disc drive 10 and generates a dummy data with the data amount. In a step S508, the dummy data and the other data files that have not been transmitted are served as the write data by the host 12, and the host 12 issues another write command to burn the write data to the optical disc 115 in the optical disc drive 10.

Please refer to FIG. 5B. Firstly, in a step S510, the optical disc drive 10 receives a write command and a write data from the host 12.

Then, the optical disc drive 10 performs a writing operation to burn the write data to the optical disc 115 from a first next write address of the optical disc 115 (Step S512).

When the optical disc drive 10 receives a specified data block and the optical disc write failure occurs, the optical disc drive 10 stops the writing operation (Step S514). The next address of the burning end address of the specified data block is set as a second next write address by the optical disc drive 10 and recorded in the optical disc 115, and the optical disc drive 10 responds a write fail message to the host 12 (Step S516). In the step S514 and the step S516, the optical disc drive 10 has received the specified data block, but the specified data block has not been completely burnt to the optical disc 115. For example, the specified data block is temporarily stored in the buffer 113, but has not been completely burnt to the optical disc 115.

Then, in a step S518, the optical disc drive 10 receives another write command and the write data from the host 12. Then, the optical disc drive 10 performs the writing operation to burn the write data to the optical disc 115 from the second next write address of the optical disc 115 (Step S520).

From the above descriptions, even the optical disc write failure occurs while the optical disc drive 10 performs the writing operation on the optical disc 115, the control method of the present invention can continue to burn data to the storage space of the optical disc 115. According to the last data block received, the control circuit 101 of the optical disc drive 10 obtains the end burning address of the last data block on the track of the optical disc 115 to set the updated next write address NWAn. In addition, the updated next write address NWAn is recorded in a lead-in area of the optical disc 115. Then, the host 12 issues another write command. In the write command, the dummy data and the other data files that have not been transmitted are served as the write data. The write data continues to be transmitted to the optical disc drive 10. Consequently, the optical disc drive 10 can continue to perform the writing operation.

As mentioned above, except the second data file (Data file 2) is damaged because of the optical disc write failure, by using the control method of the present invention, the writing operation can continue to be performed to burn the write data on the track of the optical disc 115 having not been burnt. Besides, the host 12 can additionally control the optical disc drive 10 to burn the second data file (Data file 2) to other position of the optical disc 115.

In some embodiments, the host 12 confirms the damaged data file according to other methods. For example, after the writing operation is completed, the host 12 confirms the damaged data file according to the result of a verify-after-write operation that is performed by the optical disc drive 10. Alternatively, the host 12 issues a write-fail-address-enquiry command to the optical disc drive 10. After the optical disc drive 10 receives the write-fail-address-enquiry command, the optical disc drive 10 responds the write fail address to the host 12. According to the write fail address, the host 12 confirms the damaged data file.

In some situations, more than one data files are possibly damaged. For recognizing the damaged data files, the control method as shown in FIGS. 5A and 5B could be modified.

FIGS. 6A-6C schematically illustrate a variant example of the control method of the optical disc drive system according to the first embodiment of the present invention when an optical disc write failure occurs. For example, the host 12 intends to burn the write data including a first data file (Data file 1), a second data file (Data file 2), a third data file (Data file 3) and a fourth data file (Data file 4) to the optical disc 115. The host 12 issues the write command and the write data to the optical disc drive 10. During the process of transmitting the write data, the write data is divided into plural data blocks by the host 12. The data blocks are sequentially transmitted to the optical disc drive 10 and temporarily stored in the buffer 113.

When the writing operation is started, the control circuit 101 controls the optical pickup head to burn the write data to the corresponding track of the optical disc 115 from the next write address NWAn−1. In addition, the write data is continued to transmit from the host 12 to the buffer 113.

Please refer to FIG. 6A. The optical pickup head burns the data block of the second data file (Data file 2) to the optical disc 115, and the optical disc write failure occurs while the optical pickup head burns the data block to the position 450 of the track of the optical disc 115. Meanwhile, the optical disc drive 10 stops burning the write data. Moreover, the control circuit 101 responds a write fail message to the host 12.

When the host 12 receives the write fail message from the optical disc drive 10, the host 12 stops transmitting the write data to the optical disc drive 10. Moreover, according to the last data block that the host 12 transmits to the optical disc drive 10, the host 12 can confirm the damaged data file. As shown in FIG. 6A, the last data block belongs to the third data file (Data file 3). Consequently, the host 12 confirms that the third data file (Data file 3) is damaged.

Then, the control circuit 101 sets the next address of the burning end address of the last data block on the track of the optical disc 115 as the next write address NWAn. Moreover, the next write address NWAn is recorded in the lead-in area of the optical disc 115.

After the next write address NWAn is recorded in the optical disc 115 and the host 12 confirms that the third data file (Data file 3) is damaged, the data amount of the third data file (Data file 3) that has not been transmitted to the optical disc drive 10 is calculated by the host 12. Moreover, the third data file (Data file 3) that has not been transmitted to the optical disc drive 10 is replaced by a dummy data.

Then, please refer to FIG. 6B. The host 12 issues the write command again. In the write command, the dummy data and the fourth data file (Data file 4) are served as the write data. The write data is transmitted to the buffer 113. Accordingly, the control circuit 101 starts the writing operation again, and the control circuit 101 controls the optical pickup head to burn the write data to the corresponding track of the optical disc 115 from the next write address NWAn.

Please refer to FIG. 6C. After the write data including the dummy data and the fourth data file (Data file 4) is burnt to the corresponding track of the optical disc 115, the writing operation is completed. The next address of the final burning address of the track of the optical disc 115 is the new next write address NWAn+1. And, the new next write address NWAn+1 is recorded in the lead-in area of the optical disc 115.

According to the information of the last data block, the host 12 confirms that only the third data file (Data file 3) is damaged. However, after the writing operation is completed, the host 12 confirms that the second data file (Data file 2) is also damaged according to the result of a verify-after-write operation that is performed by the optical disc drive 10. Alternatively, the host 12 issues a write-fail-address-enquiry command to the optical disc drive 10, and confirms that the second data file (Data file 2) is also damaged according to the write fail address responded by the optical disc drive 10.

As mentioned above, except the second data file (Data file 2) and the third data file (Data file 3) are damaged because of the optical disc write failure, by using the control method of the present invention, the writing operation can continue to be performed to burn the write data on the track of the optical disc 115 having not been burnt. Besides, the host 12 can additionally control the optical disc drive 10 to burn the second data file (Data file 2) and the third data file (Data file 3) to other positions of the optical disc 115.

In an embodiment, after the host 12 receives the write fail message and before the write command is issued again, the host 12 issues a blank track search command to the optical disc drive 10 in order to judge whether the track posterior to the write failure position is damaged.

Figure 7A:
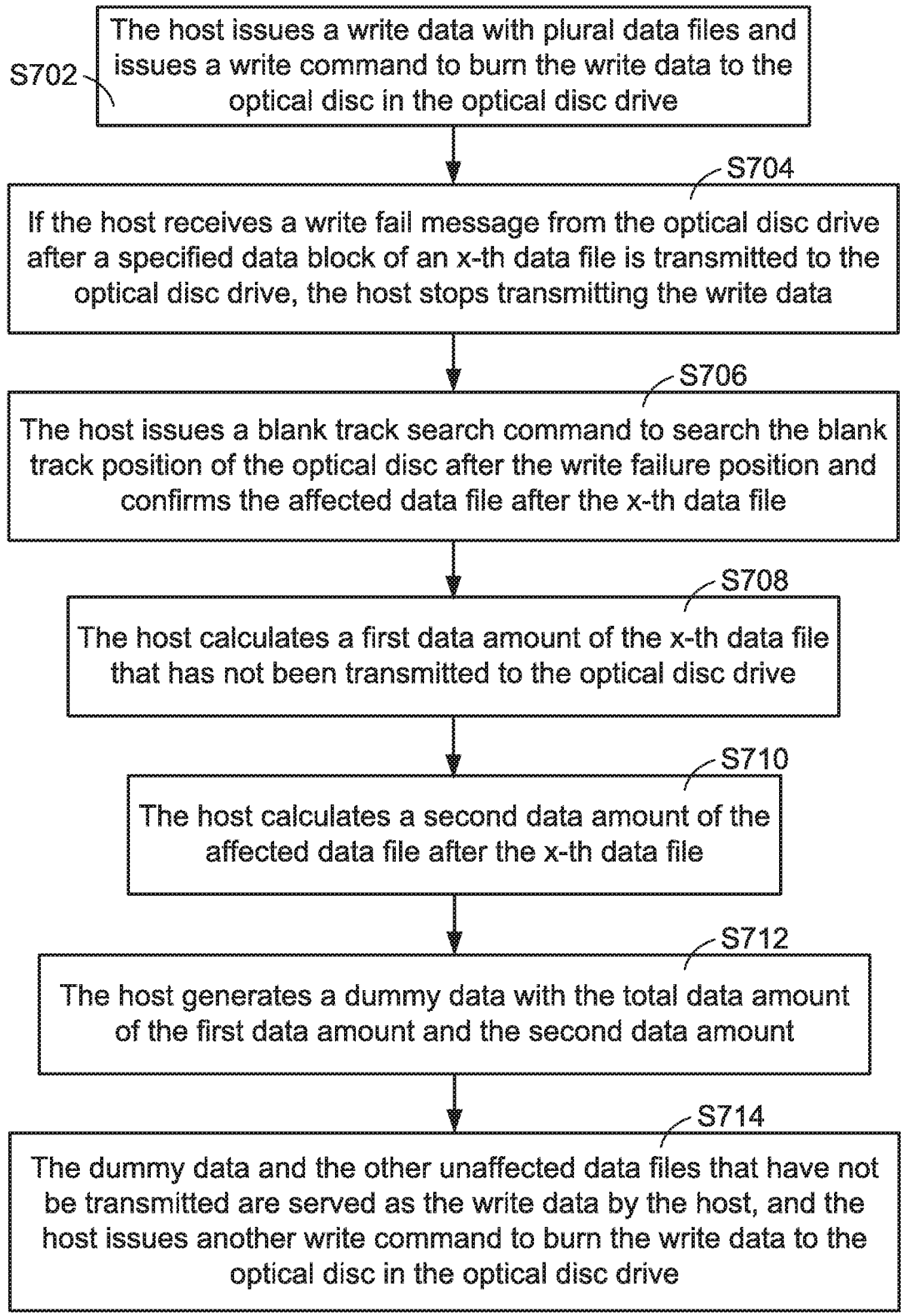
FIG. 7A is a flowchart illustrating the operations of the host according to a second embodiment of the present invention when the optical disc write failure occurs.
Figure 7B:
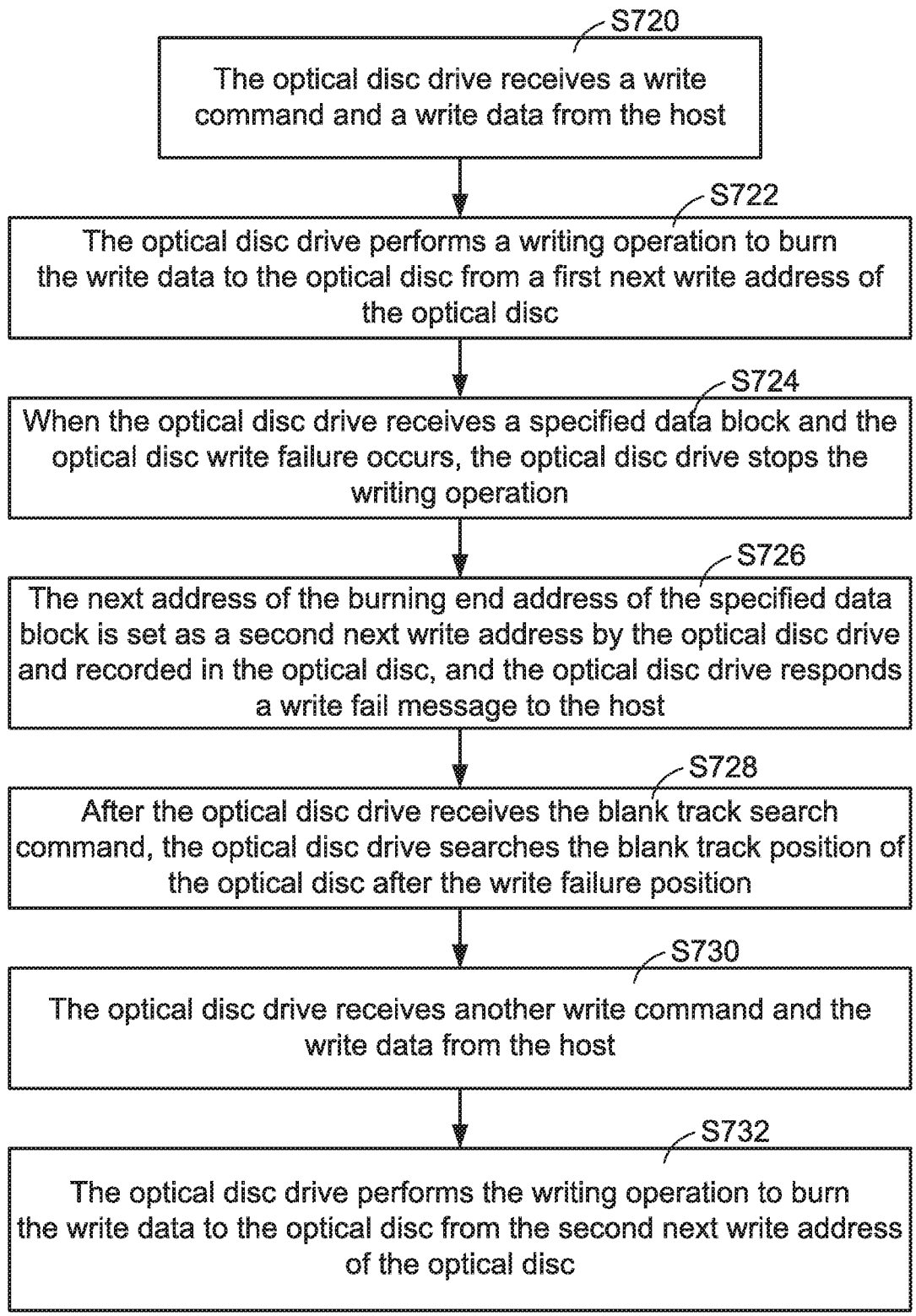
FIG. 7B is a flowchart illustrating the operations of the optical disc drive according to the second embodiment of the present invention when the optical disc write failure occurs.

FIG. 7A is a flowchart illustrating the operations of the host according to a second embodiment of the present invention when the optical disc write failure occurs. FIG. 7B is a flowchart illustrating the operations of the optical disc drive according to the second embodiment of the present invention when the optical disc write failure occurs.

Please refer to FIG. 7A. Firstly, in a step S702, the host 12 issues a write data with plural data files and issues a write command to burn the write data to the optical disc 115 in the optical disc drive 10.

If the host 12 receives a write fail message from the optical disc drive 10 after a specified data block of an x-th data file is transmitted to the optical disc drive 10, the host 12 stops transmitting the write data (Step S704).

Then, the host 12 issues a blank track search command to search the blank track position of the optical disc 115 after the write failure position and confirms the affected data file after the x-th data file (Step S706).

In a step S708, the host 12 calculates a first data amount of the x-th data file that has not been transmitted to the optical disc drive 10. Then, the host 12 calculates a second data amount of the affected data file after the x-th data file (Step S710). Then, the host 12 generates a dummy data with the total data amount of the first data amount and the second data amount (Step S712).

In a step S714, the dummy data and the other unaffected data files that have not been transmitted are served as the write data by the host 12, and the host 12 issues another write command to burn the write data to the optical disc 115 in the optical disc drive 10.

Please refer to FIG. 7B. Firstly, in a step S720, the optical disc drive 10 receives a write command and a write data from the host 12.

Then, the optical disc drive 10 performs a writing operation to burn the write data to the optical disc 115 from a first next write address of the optical disc 115 (Step S722).

When the optical disc drive 10 receives a specified data block and the optical disc write failure occurs, the optical disc drive 10 stops the writing operation (Step S724).

The next address of the burning end address of the specified data block is set as a second next write address by the optical disc drive 10 and recorded in the optical disc 115, and the optical disc drive 10 responds a write fail message to the host 12 (Step S726).

After the optical disc drive 10 receives the blank track search command, the optical disc drive 10 searches the blank track position of the optical disc after the write failure position (Step S728).

Then, in a step S730, the optical disc drive 10 receives another write command and the write data from the host 12. Then, the optical disc drive 10 performs the writing operation to burn the write data to the optical disc 115 from the second next write address of the optical disc 115 (Step S732).

Figure 8A:
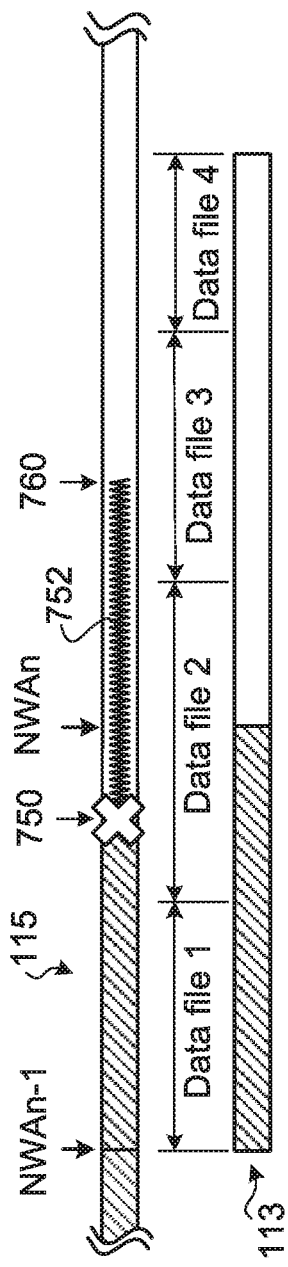
FIGS. 8A-8C schematically illustrate a control method of an optical disc drive system according to a second embodiment of the present invention when an optical disc write failure occurs.
Figure 8B:
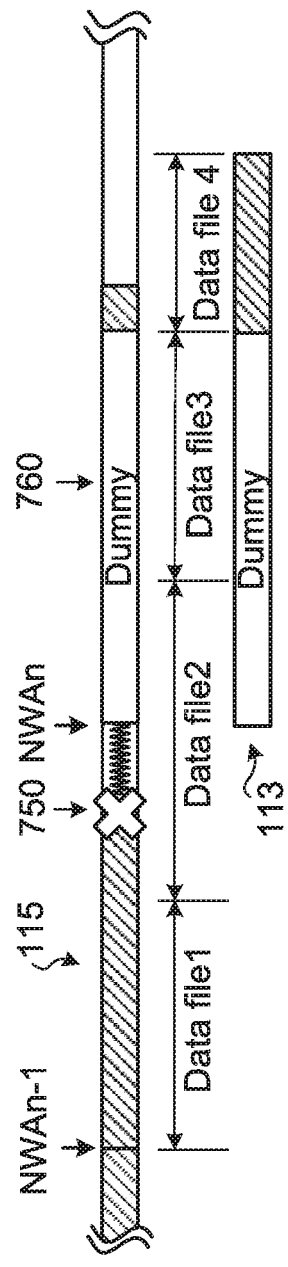
Figure 8C:
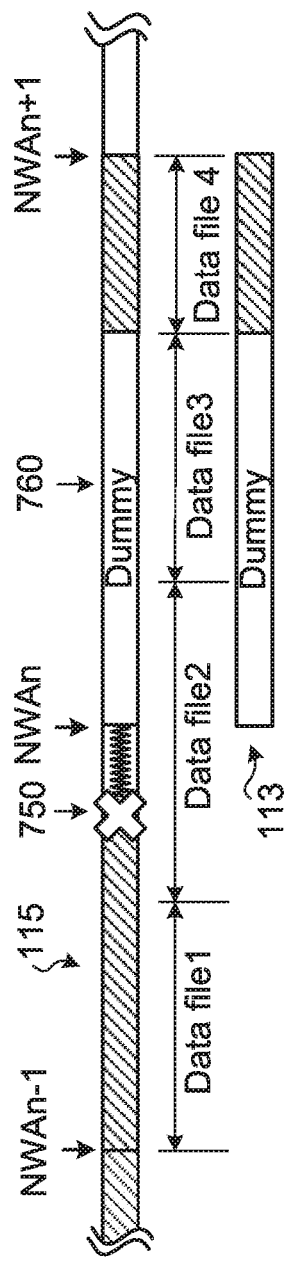

FIGS. 8A-8C schematically illustrate a control method of an optical disc drive system according to a second embodiment of the present invention when an optical disc write failure occurs. For example, the host 12 intends to burn a write data including a first data file (Data file 1), a second data file (Data file 2), a third data file (Data file 3) and a fourth data file (Data file 4) to the optical disc 115. The host 12 issues the write command and the write data to the optical disc drive 10. During the process of transmitting the write data, the write data is divided into plural data blocks by the host 12. The data blocks are sequentially transmitted to the optical disc drive 10. The data blocks are temporarily stored in the buffer 113.

When the writing operation is started, the control circuit 101 controls the optical pickup head to burn the write data to the corresponding track of the optical disc 115 from the next write address NWAn−1. In addition, the write data is continued to transmit from the host 12 to the buffer 113.

Please refer to FIG. 8A. The optical pickup head burns the data block of the second data file (Data file 2) to the optical disc 115, and the optical disc write failure occurs while the optical pickup head burns the data block to the position 750 of the track of the optical disc 115. Meanwhile, the optical disc drive 10 stops burning the write data. Moreover, the control circuit 101 responds a write fail message to the host 12.

When the host 12 receives the write fail message from the optical disc drive 10, the host 12 stops transmitting the write data to the optical disc drive 10. Moreover, according to the last data block that the host 12 transmits to the optical disc drive 10, the host 12 can confirm the damaged data file. As shown in FIG. 8A, the last data block belongs to the second data file (Data file 2). Consequently, the host 12 confirms that the second data file (Data file 2) is damaged.

In this embodiment, the control circuit 101 sets the next write address according to the information of the last data block. Please refer to FIG. 8A. The control circuit 101 sets the next address of the burning end address of the last data block on the track of the optical disc 115 as the next write address NWAn. Moreover, the next write address NWAn is recorded in the lead-in area of the optical disc 115. The last data block received by the control circuit 101 is the last data block that is sent from the host 12 to the optical disc drive 10. In this embodiment, the last data block is temporarily stored in the buffer 113 but is not completely burnt to the track of the optical disc 115.

Then, the host 12 issues a blank track search command to the optical disc drive 10. According to the blank track search command, the optical disc drive 10 searches the blank track position of the optical disc 115 after the write failure position 750. That is, searching a position on the track of the optical disc 115 where the write data can be written to after the write failure position 750. In FIG. 8A, the damaged track 752 of the optical disc 115 is indicated by a zigzag line. According to the blank track search command, the optical disc drive 10 recognizes that the track posterior to the position 760 is the blank track. The optical disc drive 10 responds the blank track position to the host 12. Consequently, the host 12 recognizes the affected data file. For example, the optical disc drive 10 responds the blank track position 760 of the track of the optical disc 115 to the host 12.

Please refer to FIG. 8B. According to the blank track position 760, the host 12 confirms that the third data file (Data file 3) is affected. Consequently, the third data file (Data file 3) is the affected data file. In other words, both of the second data file (Data file 2) and the third data file (Data file 3) are damaged.

Then, the host 12 calculates a first data amount of the second data file (Data file 2) that has not been transmitted to the optical disc drive 10. Then, the host 12 calculates a second data amount of the affected data file, i.e., the third data file (Data file 3). Then, the host 12 generates a dummy data with the total data amount of the first data amount and the second data amount.

Please refer to FIG. 8B again. The host 12 issues another write command. In the write command, the dummy data and the other unaffected data files that have not been transmitted are served as the write data. For example, the fourth data file (Data file 4) is the unaffected data file. The write data is transmitted to the buffer 113. When the writing operation is started again, the control circuit 101 controls the optical pickup head to burn the write data to the corresponding track of the optical disc 115 from the next write address NWAn.

Please refer to FIG. 8C. After the write data including the dummy data and the fourth data file (Data file 4) is burnt to the corresponding track of the optical disc 115, the writing operation is completed. The address next to the final burning address of the track of the optical disc 115 is the new next write address NWAn+1. The new next write address NWAn+1 is recorded in the lead-in area of the optical disc 115.

As mentioned above, the present invention provides a control method of the optical disc drive system when the optical disc write failure occurs. The control circuit 101 of the optical disc drive 10 sets the next write address NWAn according to the burning end address of the last data block on the track of the optical disc 115. Moreover, the next write address NWAn is recorded in the lead-in area of the optical disc 115. The host 12 issues the blank track search command to recognize the affected data file. The damaged data file and the affected data file are replaced by the dummy data. Then, the host 12 issues the write command again. In the write command, the dummy data and the other unaffected data files are served as the write data. The write data is transmitted to the optical disc drive 10. Consequently, the optical disc drive 10 can continue to perform the writing operation according to the next write address NWAn.

As mentioned above, except the second data file (Data file 2) and the third data file (Data file 3) are damaged because of optical disc write failure occurs, by using the control method of the present invention, the writing operation can continue to be performed to burn the write data on the track of the optical disc 115 having not been burnt. Besides, the host 12 can additionally control the optical disc drive 10 to burn the second data file (Data file 2) and the third data file (Data file 3) to other positions of the optical disc 115.

From the above descriptions, the present invention provides a control method of an optical disc drive system when the optical disc write failure occurs. If the optical disc write failure occurs while the optical disc drive performs the writing operation, it is necessary to take a proper measure to allow the write data continue to be burnt to the optical disc in order to make efficiently use of the storage space of the optical disc.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method of an optical disc drive system when an optical disc write failure occurs, the control method comprising steps of:
    issuing a first write command to burn a first write data to an optical disc in an optical disc drive, wherein the first write data contains plural data files;
    if a write fail message from the optical disc drive is received after a specified data block of a specified data file of the plural data files is transmitted to the optical disc drive, stopping transmitting the first write data;
    calculating a data amount of the specified data file that has not been transmitted to the optical disc drive, and generating a dummy data with the data amount; and
    issuing a second write command to burn a second write data to the optical disc in the optical disc drive, wherein the dummy data and the other data files that have not been transmitted are served as the second write data,
    wherein if the optical disc write failure occurs after the optical disc drive receives the specified data block, the optical disc drive stops a writing operation, sets an updated next write address according to a burning end address of the specified data block, records the updated next write address into the optical disc, and generates the write fail message to a host.

2. The control method as claimed in claim 1, wherein the updated next write address is recorded in a lead-in area of the optical disc.

3. The control method as claimed in claim 1, further comprising steps of:
    the optical disc drive receiving the first write command and the first write data from the host;
    controlling an optical pickup head to burn the first write data to a track of the optical disc from a next write address of the optical disc when the optical disc drive performs a writing operation;
    the optical disc drive receiving the second write command and the second write data from the host; and
    controlling the optical pickup head to burn the second write data to the track of the optical disc from the updated next write address of the optical disc when the optical disc drive performs the writing operation according to the second write command.

4. The control method as claimed in claim 3, wherein after the second write data is successfully burnt to the track of the optical disc, an address next to a final burning address of the track of the optical disc is set as another updated next write address by the optical disc drive.

* * * * *